July 24, 1951   F. L. BROWN   2,561,559
FAUCET UNIT
Filed July 26, 1945
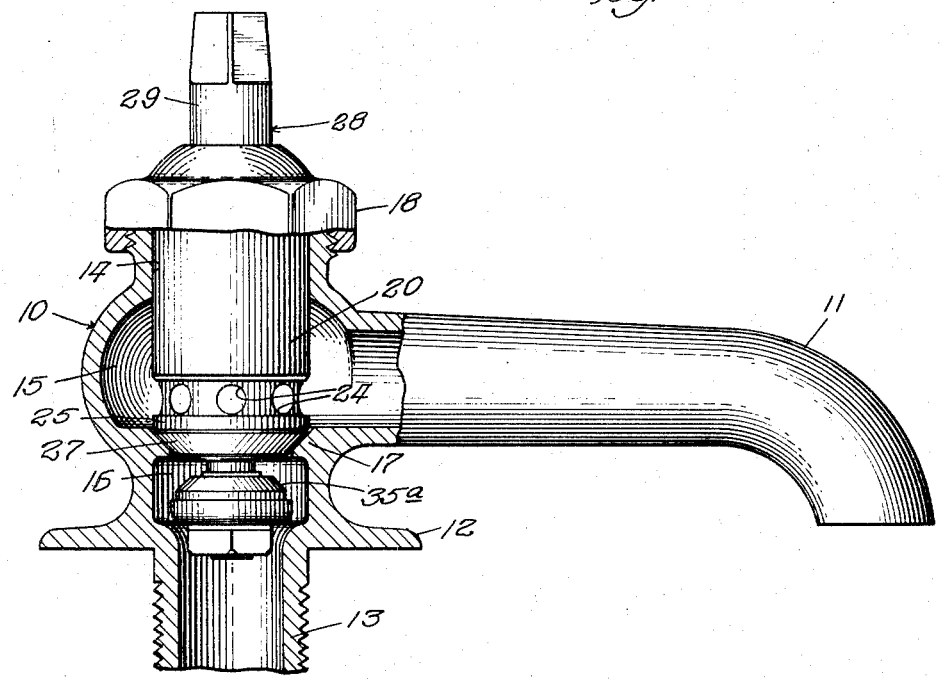
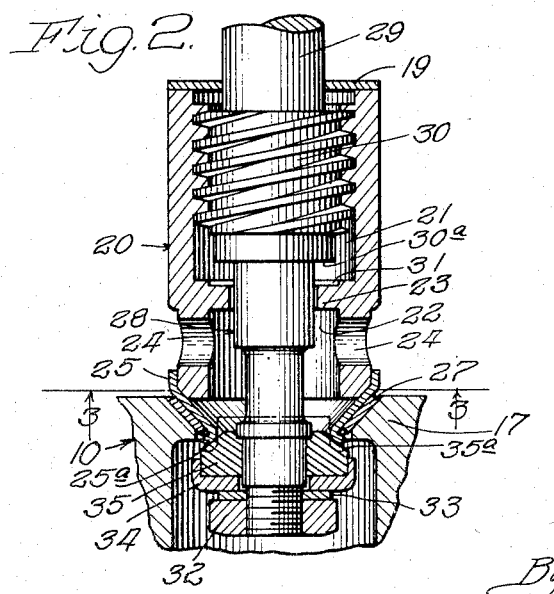
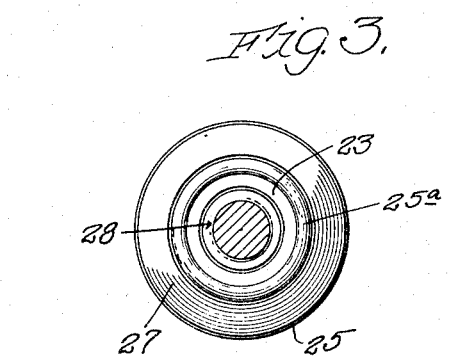
Inventor:
Frank L. Brown,
By Chritton, Wiles, Schroeder,
Merriam & Hofgren, Attys.

Patented July 24, 1951

2,561,559

UNITED STATES PATENT OFFICE 2,561,559

FAUCET UNIT

Frank L. Brown, Park Ridge, Ill., assignor to Chicago Faucet Company, a corporation of Illinois Application July 26, 1945, Serial No. 607,189

1 Claim. (Cl. 251—167)

The present invention relates to a faucet unit and more particularly to novel seating arrangements for a replaceable unitary valve operating mechanism and for the valve washer thereof.

Heretofore, faucet units, especially those provided with rotatable valve members, have tended to wear out and leak at two points around the valve seat. One point of wear and leakage, and one which has heretofore presented considerable difficulty in overcoming, is between the valve seat and the part of the casing upon which the seat rests, which usually takes the form of an inwardly extending flange having a beveled surface forming a base or seat for the removable operating unit. The valve seat itself is an annular member of sheet metal, such as brass, attached to the removable operating unit, this sheeet metal member seating upon the beveled surface of the casing. If the removable unit is not sufficiently initially tightened or secured in the faucet casing, water will leak between these seating parts. Furthermore, sand or grit often works its way between these parts and pits or cuts them badly. The present invention avoids or corrects this condition by the insertion of a pliable member or gasket of pliable material between the sheet metal member and the beveled surface of the casing on which it seats. This gasket, which may be of asbestos, rubber, plastic or similar pliable or deformable material will, under pressure, created by tightening down the unit operating mechanism, become deformed and fill in the cuts and pitted spaces in the parts and maintain an effective seal therebetween. The invention further involves the providing of a new valve seat member of sheet material which has means to carry the gasket and retain it in proper position at all times. It not only is not necessary to position the gasket in its proper place in the casing by hand but, when the unit operating mechanism is removed from or replaced in the casing, it will carry the gasket with it. This eliminates the necessity of fishing the gasket out by hand and the possibility of its falling into the supply pipe.

Another point is the line of contact between the valve seat and valve member. Engagement of the valve member with the valve seat rubs or "scuffs" a groove in the valve member, which is usually a washer of soft material, as rubber or rather soft metal having a face which contacts the valve seat beveled at an angle of about 45° to the vertical. This rubbing or scuffing finally makes a groove that becomes so large that water leaks around the seat. The present invention eliminates this by so positioning the parts that the seat gradually wears a groove into the washer that eventually presents a substantially flat horizontal surface which the valve seat contacts over a relatively wide area, as compared with the initial line contact therebetween. This limits the grooving action so that it substantially stops at this point.

Other objects, advantages and features of the invention will be apparent from the following specification and the drawings, in which:

Fig. 1 is a side elevational view, partly in cross section, of a faucet in which an embodiment of the invention is incorporated, showing the valve in open position.

Fig. 2 is an enlarged vertical sectional view of the removable unit and a portion of the casing, showing the valve in closed position.

Fig. 3 is a sectional view taken on the line 3—3 of Fig. 2.

In the embodiment of the invention shown in the drawings, 10 represents a valve casing having a nozzle 11 extending therefrom. The casing is provided with a base 12 adapted to be secured to a plumbing fixture, such as a tub or basin, in the usual manner, and a downwardly extending threaded pipe 13 adapted for attachment to a water supply pipe. The word "downwardly" as used hereinabove, and other similar words used throughout the specification and claims are related to the particular position of the faucet as shown in the drawings, and are to be correspondingly construed in other faucet positions.

A cylindrical opening 14 is provided in the upper part of the casing 10. This opening communicates with a chamber 15 which in turn communicates with the bore of the nozzle 11. Immediately beneath this chamber 15, and above the pipe 13, is a valve chamber 16. Between the chambers 15 and 16 is an opening in the casing having therearound a beveled annular flange 17, this flange providing the seat for the unit operating mechanism.

Removably mounted in the casing 10 and held therein by nut 18 and washer 19 is the removable unit operating mechanism comprising a sleeve member 20 in which is an upper chamber 21 and a lower chamber 22 between which is an annular flange 23, which provides a restricted opening or passageway between the chambers 21 and 22. The bottom of the lower chamber 22 is open, communicating with the valve chamber 16. The lower chamber 22 also communicates with the chamber 15 through openings 24 in its side. The lower outer end of the sleeve member 20 is beveled complementary to the bevel of the flange 17 in the casing, and adapted to receive an annular seat member 25 therearound. This member is of sheet metal, preferably brass, and extends downwardly and inwardly from the lower end of the sleeve member 20 and terminates in an outwardly extending flange 25a which forms the valve seat proper. Around the seat member 25 and retained there by the flange 25a is a gasket 27 of asbestos, rubber, or other pliable material.

The upper portion of the inner wall of the sleeve member 20 is threaded for the reception of external threads on the combination stem and valve member part or unit 28 which extends through the sleeve member. The part 28 has a stem proper 29 to which a handle (not shown) is adapted to be attached and below which is the threaded portion 30. Below the threaded portion 30 the part 28 is provided with a shoulder 30a adapted to be received in a recess 31 in the top of the flange 23 of the sleeve 20 when the valve is open. The member 28 is reduced below the shoulder 30a sufficiently to pass through the opening in the flange 23 and at its lower end is provided with a threaded nut 32 above which is a flat washer 33 and flanged washer 34, the latter providing a seat for the valve washer 35. Complementary shoulders are provided on the member 28 and valve washer 35 so as to insure proper positioning of the latter.

The upper surface of the valve member 35 is beveled to form a surface 35a which contacts the valve seat 25a upon closing of the valve. The angle of the beveled surface 35a is preferably about 38° to the horizontal, rather than the 45° heretofore generally used. The valve washer beveled surface 35a initially has a line contact with the valve seat 25a, but rubbing of the members against each other in use will gradually cause the seat to wear a groove in the valve washer beveled surface 35a which results in more contact between the members until the lower surface of the groove, like the lower surface of the seat 25a, is substantially horizontal (as shown in dotted lines in Fig. 2). This ultimate flat seat with the increased amount of contact area between the seating parts substantially stops further grooving action while still providing an effective seal.

The gasket 27 is so formed that the opening around its lower end is of less diameter than that of the outwardly extending flange or valve seat portion 25a of the sheet metal part 25. Being of pliable material, the gasket 27 may be stretched and placed above the flange 25a and around the member 25. The flange 25a then serves to retain the gasket 27 in proper position to seal the space between the beveled surface of the flange 17 of the casing and the seat member 25, as well as to carry the gasket 27 while the unit operating mechanism is being installed into, or removed from, the casing 10.

While I have shown and described certain embodiments of my invention, it is to be understood that it is capable of many modifications. Changes, therefore, in the construction and arrangement may be made without departing from the spirit and scope of the invention as disclosed in the appended claim.

I claim:

In a faucet having a casing with an inwardly extending flange, a removable unit operating mechanism in said casing including: an annular sheet metal seat member removably mounted on said unit and adapted to lie closely adjacent to but slightly spaced from said flange; and a pliable member on said seat member sealing the space between said seat member and said flange, the inner edge of said annular sheet metal member being turned downwardly and outwardly and the inner edge of said pliable member being of slightly less diameter than said outwardly turned edge, whereby the seat member provides a valve seat for a valve member and provides a retaining means for said pliable member.

FRANK L. BROWN.

REFERENCES CITED

The following references are of record in the file of this patent:

UNITED STATES PATENTS

| Number | Name | Date |
|--------|------|------|
| 951,407 | Moore | Mar. 8, 1910 |
| 1,635,875 | Albrecht | July 12, 1927 |
| 1,640,527 | Brown | Aug. 30, 1927 |
| 1,856,664 | Steen | May 3, 1932 |
| 1,985,382 | Schachter | Dec. 25, 1934 |
| 2,089,848 | Hoferle | Aug. 10, 1937 |